April 7, 1942.                J. W. OVERBEKE                2,278,557
                           AIRCRAFT CONSTRUCTION
                             Filed July 15, 1939
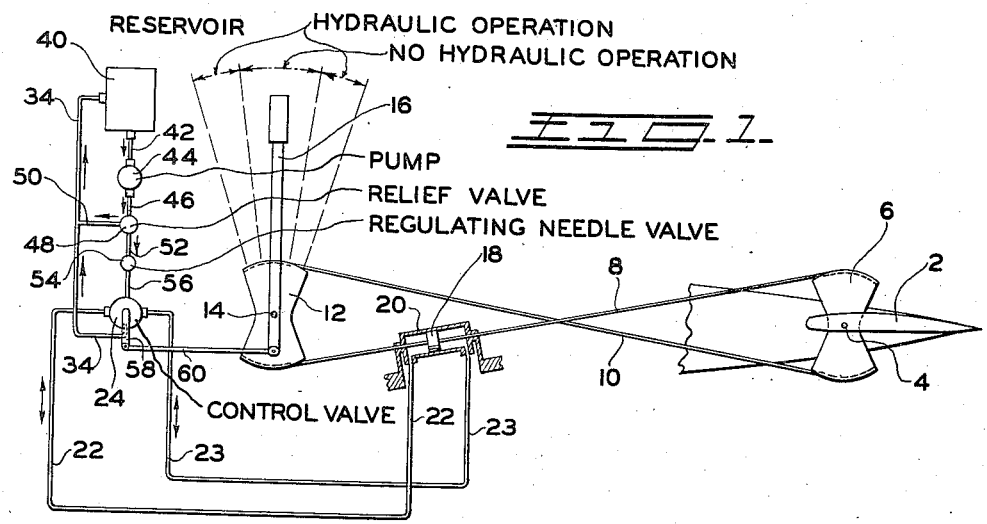
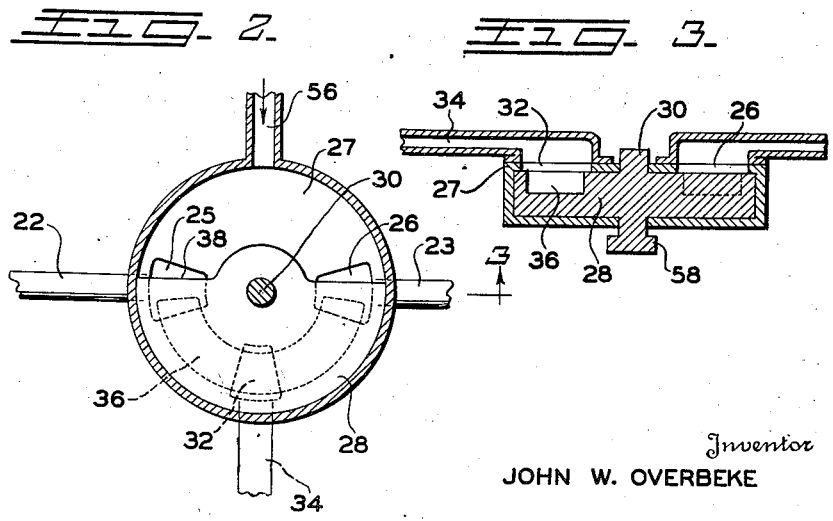
JOHN W. OVERBEKE Patented Apr. 7, 1942

2,278,557

UNITED STATES PATENT OFFICE 2,278,557

AIRCRAFT CONSTRUCTION

John W. Overbeke, Anneslie, Md., assignor to The Glenn L. Martin Company, Baltimore, Md.

Application July 15, 1939, Serial No. 284,675

10 Claims. (Cl. 244—85)

The present invention relates to the control of aircraft surfaces, and more particularly to a hydraulic mechanism for aiding in the manual control of such surfaces.

Various devices are known for controlling the position of aircraft surfaces both manually and by electrical or hydraulic mechanisms. It is difficult, however, to convert a manual control into a hydraulic control. Thus where it is found that larger forces are required for manipulating an aircraft that can be conveniently exerted by hand, an entirely new control system must often be introduced into the aircraft.

Some types of devices have been known which assist the manual control by the use of hydraulic or electric devices embodying follow-up mechanisms. These are complex and require constant attention and care.

The primary object of the present invention is to provide a booster arrangement by which the manual force required for operating aircraft surfaces can be reduced. Particularly, the purpose is to provide a device of this type which can be applied to ordinary aircraft controls in a simple manner without requiring a new control system.

A further object of the invention is to provide a mechanism of this type which is very simple and which does not require the use of follow-up mechanism in order to render it useful to the pilot of an aircraft.

The invention utilizes a booster which, while permitting full manual control at all times, exerts a force which assists the manual force in overcoming the resistance to movement offered by the supporting surface. Thus the "booster" force is exerted at least during the portions of the control surface movement furthest from normal position, where the forces to be overcome are greatest.

Further objects and advantages of the invention will appear more fully from the following description, especially when taken in conjunction with the accompanying drawing, which forms a part thereof.

In the drawing:

Fig. 1 is a partially diagrammatic view showing an aircraft control system embodying my invention;

Fig. 2 is a vertical cross section through the control valve of the apparatus; and Fig. 3 is a cross section on the line 3—3 of Fig. 2.

As shown in the drawing, the invention is applied to the control of an aircraft surface such as 2 which is pivoted at 4. This surface may be an elevator, a rudder, and aileron or any other movable surface. Normally, the force required to move such a surface increases propressively as the surface is moved further from its normal position, in which it is shown in Fig. 1. Rigid with the surface 2 is a double quadrant member 6 to opposite sides of which are connected crossing cables 8 and 10. These cables are connected to opposite sides of a second double quadrant member 12 pivoted at 14 and rigid with a manual control lever 16. It is obvious that when the control lever 16 is moved in one direction or the other it will shift the control surface 2.

Power is applied to boost the manual force exerted on the control mechanism, at least during the parts of the movement of the control surface when it is furthest from neutral position, by a piston 18 which is mounted on the cable 10 and is arranged to slide in a fixed cylinder 20. Fluid may be supplied to and withdrawn from opposite ends of the cylinder, or opposite sides of the piston 18, by pipes 22, 23 leading to a control valve 24 shown in more detail in Figs. 2 and 3.

The control valve has in one of its side walls 27 two opposed openings 25, 26 into which lead the pipes 22, 23 respectively. The movable member of the valve comprises a block 28 substantially semicylindrical in shape, mounted to turn on a central axis or stem 30. In the same wall 27 of the valve in which the openings 25, 26 are located, there is an opening 32 located half way between the openings 25, 26 and communicating with a pipe 34. The movable valve member 28 is provided in one face thereof with a groove or slot 36 which extends around the greater portion of the semicylindrical body 28, but terminates at a slight distance from the radial edges 38 thereof.

The supply of fluid to the valve and its return are accomplished through the circuit shown in Fig. 1. From a reservoir 40 the fluid flows through a pipe 42 to a pump 44, and thence through a pipe 46 to a relief valve 48 which is set to permit fluid to escape through the shunt pipe 50 whenever the pressure exceeds a predetermined amount. Normally the fluid flows through pipe 52, needle valve 54 and pipe 56 to the top of the control valve 24. The needle valve 54 may be regulated to control the flow of fluid to the control valve 24. Pipe 34 leads back to the reservoir 40, the shunt pipe 50 communicating therewith.

Rigid with the shaft or stem 30 of the valve body 28 is a lever 58 which is connected by a link 60 to the lower end of the manual lever 16.

The operation of the device is as follows:

While the control lever 16 is being moved within the central portion of its range, as indicated by the arrow marked "No hydraulic operation" in Fig. 1, the device operates purely manually. In other words, the control surface 2 is turned only by the manual force exerted on the lever 16. During this portion of the movement of the control surface the loads thereon are not heavy, and can therefore easily be overcome by the pilot.

Outside of this range, and within the portions of the angular movement of lever 16 marked "Hydraulic operation" in Fig. 1, the load to be overcome by the pilot increases. It is then that the present mechanism actually comes into play.

During the movement of the control lever 16 through the normal range, the valve body 28 at no time moves so as to cover completely both of the openings 25 and 26. Therefore fluid can always flow from the inlet pipe 56 through one or both of the openings 25, 26 and groove 36 to the outlet 32 and return pipe 34. Thus no pressure is exerted in the cylinder 20.

Assuming now that the stick 16 is pulled back into the rear portion marked "Hydraulic operation," the valve 28 will be turned further and will cover the left-hand port 25 of Fig. 2. Fluid will now flow from inlet 56 through the right-hand port 26 and pipe 23 to the right-hand side of piston 18, and will thus tend to move the control surface in the same direction in which it is being moved by the lever 16. Thus it will aid the pilot in moving the control surface against the greater load which he encounters at this time. On the other hand, fluid from the left-hand side of the cylinder may flow through the other pipe 22 to the left-hand opening 25 of Fig. 2, and thence through groove 36, outlet 32 and return pipe 34 and back to the reservoir 40.

The power which is applied to the pump, and the strength of the relief valve 48, are so regulated that the force exerted is not sufficient to overcome the manual power of the operator and the resistance or load offered by the movable surface 2. For example, the area and arrangement of the parts is preferably such as to provide a boost which will take care of about 40% of the maximum load. Thus when the operator stops the movement of the stick 16, the resistance offered by the air acting on the control surface is greater than the pressure exerted by pump 44, and the pump merely helps to hold the control surface. In other words, the automatic means alone do not exert a sufficient force to overcome the resistance to movement of the control surface. The movement of the piston 18 is stopped, and the relief valve under the excess pressure of the pump will then open. The operator is easily able to move the stick back towards neutral since the force exerted by the pump is again insufficient to overcome the tendency of the surface 2 to return to neutral position, without the help of the manual power exerted by the pilot on the stick 16. In other words, the booster force is only sufficient to help the pilot in overcoming the resistance of the surface and in adding to his strength.

Obviously when the stick is moved back to the central part of its range, the valve 28 will be moved into such a position that it is no longer effective and therefore will not interfere with completely manual operation during the central part of the range.

While I have described herein some embodiments of my invention I wish it to be understood that I do not intend to limit myself thereby except within the scope of the appended claims.

I claim:

1. In a control mechanism for the surfaces of aircraft, a movable surface, a manual control member, means connecting said member to said surface without lost motion whereby movement of either said member or said surface in either direction causes corresponding movement of the other, said manual control member being movable from a normal position throughout a predetermined range of a substantial amount and means controlled by movement of said manual control member during at least a part of said range outside of said normal position only to exert a supplementary force on said surface tending to move the same away from the normal position and to maintain such force as long as said manual means is within such part of said range.

2. In a control mechanism for the surfaces of aircraft, a movable surface, a manual control member, reversible means connecting said member to said surface, said manual control member being movable from a normal position throughout a predetermined range of a substantial amount, and means controlled by movement of said manual control member during at least a part of said range outside of said normal position only to exert supplementary force on said surface tending to move the same away from the normal position and to maintain such force as long as said manual means is within such part of said range.

3. In a control mechanism for the surfaces of aircraft, a movable surface, a manual control member, means connecting said control member to said surface to move the same, said member being movable from a normal position throughout a predetermined range of a substantial amount, power means to exert a force on said control surface operatively connected thereto, a control means for said power means including an element movable through a range including a first portion in which said power means is inoperative and a second portion in which said power means is operative to exert a force on said control surface in one direction, and means, operatively connected to said element and to said control member, to hold said element in said first portion of its range when said member is in normal position, to move said element into said second portion when said control member moves to a predetermined point in its range away from said normal position in a direction to move said control surface in the same direction in which the force is exerted thereon by such power means in such second portion of the range of movement of said element, and to maintain said element in said second portion as long as said member is away from its normal position beyond such predetermined position, whereby as long as said control member is beyond such predetermined position said power means exerts a force on said surface in the same direction.

4. In a control mechanism for the surfaces of aircraft, a movable control surface, a manually operable controlling member, means connecting said controlling member to said surface to move the same, said member being movable from a normal position throughout first and second ranges, power means to exert a force on said control surface operatively connected thereto, a control means for said power means including an element movable through a range including a first portion in which said power means is inoperative and a second portion in which said power means is operative to exert a force on said control surface in one direction, and means, operatively connected to said element and to said controlling member, to hold said element in said first portion of its range when said member is in its first range, to move said element into said second portion upon movement of said control member into its second range in a direction to move said control surface in the same direction in which the force is exerted thereon by such power means in such second portion of the range of movement of said element, and to maintain said element in said second portion upon movement of said member in either direction within said second range, whereby as long as said control member is within said second range, said power means exerts a force on said surface in the same direction.

5. In a device as claimed in claim 3, said power means exerting a force which is insufficient alone to overcome the resistance to movement of the said control surface when said control member is beyond said predetermined position.

6. In a mechanism for controlling the surfaces of aircraft, a movable surface, a manually operated lever for moving said surface, cables directly connecting said lever to said surface, a piston on one of said cables, a cylinder within which said piston is movable, a source of fluid under pressure, a pump, means connecting said source of fluid to said pump and said pump to said cylinder, a control valve in said connecting means, a relief valve in said connecting means to relieve the pressure of said pump, means connecting said control valve to opposite sides of said cylinder, and means connected to said lever for moving said control valve.

7. In a mechanism for controlling the surfaces of aircraft, a movable surface, a manually operated lever for moving said surface, cables directly connecting said lever to said surface, a piston on one of said cables, a cylinder within which said piston is movable, a source of fluid under pressure, a pump, means connecting said source of fluid to said pump and said pump to said cylinder, a control valve in said connecting means, a relief valve in said connecting means to relieve the pressure of said pump, means connecting said control valve to opposite sides of said cylinder, and means connected to said lever for moving said control valve, said control valve being adapted during a predetermined range of said lever to preserve communication between both of said last connecting means and said pump.

8. In a control mechanism for the surfaces of aircraft, a movable surface, a manual control member for moving said surface, cables directly connecting said control member to said surface, said control member being movable from a normal position throughout a certain range, power means to exert a force on said control surface comprising a piston on one of said cables and a cylinder within which said piston is movable, a source of fluid under pressure, means connecting said source of fluid to said cylinder, a control means for said power means including a valve in said connecting means having an element movable through a range including a first portion in which no pressure fluid is supplied to said cylinder and a second portion in which pressure fluid is supplied to said cylinder to exert a force on said control surface in one direction, and means, operatively connected to said element and to said control member, to hold said element in said first portion of its range when said member is in normal position, to move said element into said second portion when said control member moves to a predetermined point in its range away from said normal position in a direction to move said control surface in the same direction in which the force is exerted thereon by such power means in such second portion of the range of movement of said element, and to maintain said element in said second portion as long as said member is away from its normal position beyond such predetermined position, whereby as long as said control member is beyond such predetermined position said power means exerts a force on said surface in the same direction.

9. In a mechanism for controlling the surfaces of aircraft, a movable surface, a manually operated lever for moving said surface, cables directly connecting said lever to said surface, a piston on one of said cables, a cylinder within which said piston is movable, a source of fluid under pressure, means connecting said source of fluid to said cylinder, a valve in said connecting means, and means connected to said lever for moving said valve.

10. In a mechanism for controlling the surfaces of aircraft, a movable surface, a manually operated lever movable from a normal position for moving said surface, cables directly connecting said lever to said surface, a piston on one of said cables, a cylinder within which said piston is movable, a source of fluid under pressure, means connecting said source of fluid to said cylinder, a valve in said connecting means, and means connected to said lever and operated by movement of said lever by a predetermined distance from such normal position for moving said valve.

JOHN W. OVERBEKE.